US012610147B2

(12) United States Patent
Nikhara et al.

(10) Patent No.: US 12,610,147 B2
(45) Date of Patent: Apr. 21, 2026

(54) AUTOMATIC EXPOSURE CONTROL

(71) Applicant: QUALCOMM Incorporated, San Diego, CA (US)

(72) Inventors: Soman Ganesh Nikhara, Hyderabad (IN); Sumit Gemini, Delhi (IN); Ravi Kishore Tanuku, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 18/446,340

(22) Filed: Aug. 8, 2023

(65) Prior Publication Data

US 2025/0056125 A1     Feb. 13, 2025

(51) Int. Cl.
H04N 23/73        (2023.01)
H04N 23/71        (2023.01)

(52) U.S. Cl.
CPC ............. H04N 23/73 (2023.01); H04N 23/71 (2023.01)

(58) Field of Classification Search
CPC ........ H04N 23/73; H04N 23/71; H04N 23/70; H04N 23/76; H04N 23/741; H04N 23/72; H04N 23/75
See application file for complete search history.

(56) References Cited

U.S. PATENT DOCUMENTS 6,292,589 B1 *   9/2001   Chow ................... H04N 19/176
                                                     382/250
2015/0244918 A1   8/2015   Svensson et al.

2019/0394379 A1 * 12/2019 Segapelli ............. H04N 23/741
2020/0366828 A1   11/2020 Bessou et al.
2021/0110190 A1    4/2021  Park et al.
                          (Continued)

FOREIGN PATENT DOCUMENTS

AU         2014271318 A1 *  1/2015
CN          109792540 A  *  5/2019  .......... H04N 19/172
                          (Continued)

OTHER PUBLICATIONS

International Search Report and Written Opinion—PCT/US2024/031895—ISA/EPO—Sep. 10, 2024.

*Primary Examiner* — Lin Ye
*Assistant Examiner* — Steven Daniel Barry
(74) *Attorney, Agent, or Firm* — Polsinelli LLP/QUALCOMM Incorporated

(57) ABSTRACT

Systems and techniques are described herein for adjusting settings for capturing images. For instance, a method for adjusting settings for capturing images is provided. The method may include receiving a first frame from an image sensor; determining that the first frame is overexposed based on the first frame including a brightness value greater than a threshold; adjusting image-capture settings of the image sensor for a plurality of frames such that each frame of the plurality of frames is captured using a different exposure setting of a plurality of exposure settings; comparing at least one frame of the plurality of frames to the threshold to determine an anchor frame from the plurality of frames, wherein the anchor frame includes a brightness value below the threshold; and adjusting the image-capture settings of the image sensor based on an exposure setting of the anchor frame.

30 Claims, 7 Drawing Sheets

(56)  References Cited

U.S. PATENT DOCUMENTS

| | | | | |
|---|---|---|---|---|
| 2022/0059588 A1* | 2/2022 | Lee | ................... | H10F 39/80377 |
| 2023/0007161 A1* | 1/2023 | Taamazyan | .......... | H04N 23/741 |
| 2023/0027196 A1* | 1/2023 | Akashi | ................... | G06T 7/586 |
| 2023/0247331 A1* | 8/2023 | Yoneda | .................. | H04N 25/47 |
| | | | | 348/300 |

FOREIGN PATENT DOCUMENTS

| | | | | | |
|---|---|---|---|---|---|
| CN | 113163113 A | * | 7/2021 | ........... | H04N 23/665 |
| CN | 116542917 A | * | 8/2023 | ........... | G06T 7/0004 |
| KR | 20180020565 A | * | 2/2018 | .............. | G06T 1/20 |
| TW | 201338519 A | * | 9/2013 | ............. | H04N 23/73 |

* cited by examiner

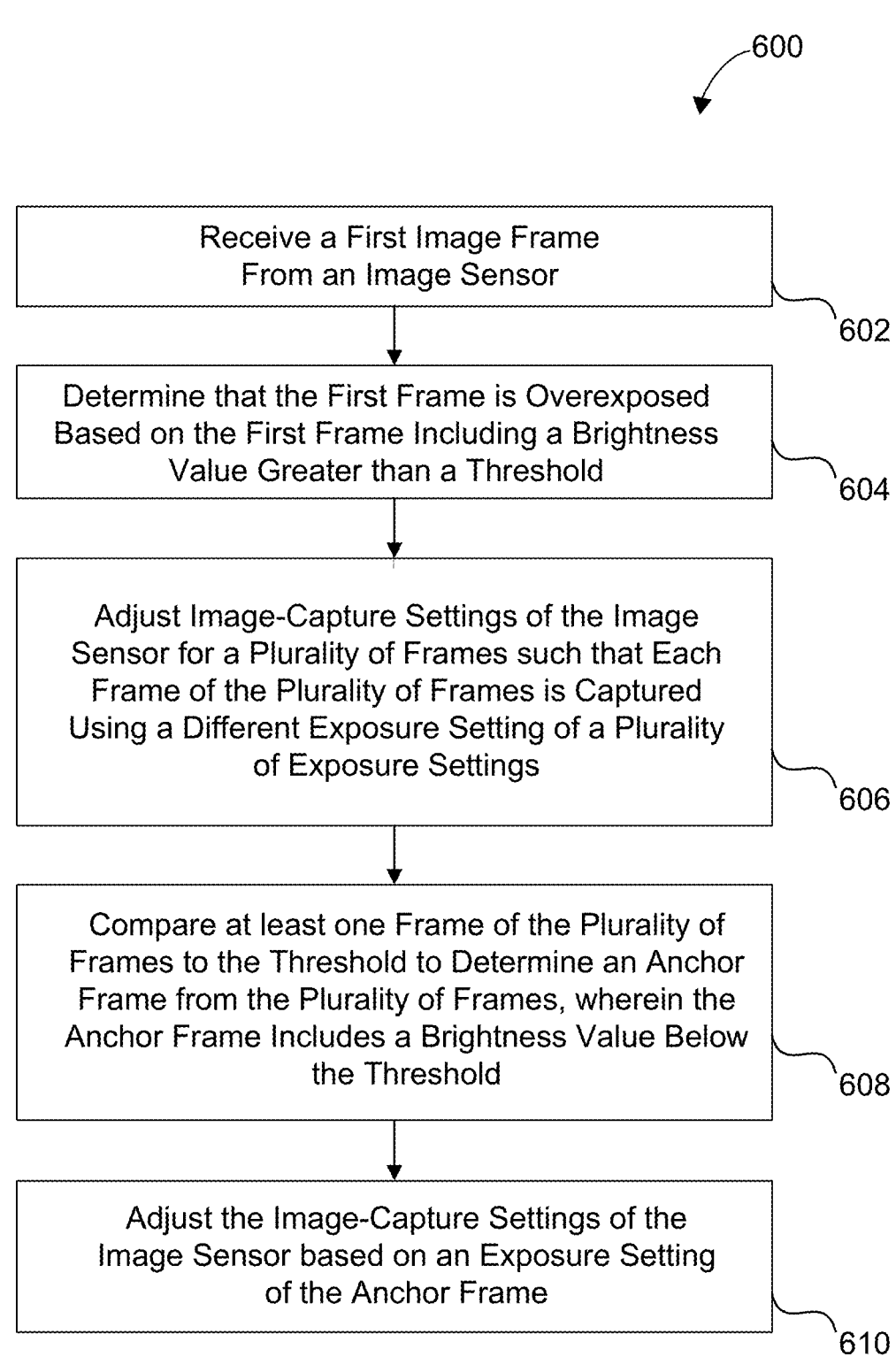

600

Receive a First Image Frame
From an Image Sensor

602

Determine that the First Frame is Overexposed
Based on the First Frame Including a Brightness
Value Greater than a Threshold

604

Adjust Image-Capture Settings of the Image
Sensor for a Plurality of Frames such that Each
Frame of the Plurality of Frames is Captured
Using a Different Exposure Setting of a Plurality
of Exposure Settings

606

Compare at least one Frame of the Plurality of
Frames to the Threshold to Determine an Anchor
Frame from the Plurality of Frames, wherein the
Anchor Frame Includes a Brightness Value Below
the Threshold

608

Adjust the Image-Capture Settings of the
Image Sensor based on an Exposure Setting
of the Anchor Frame

AUTOMATIC EXPOSURE CONTROL

TECHNICAL FIELD

The present disclosure generally relates to automatic exposure control. For example, aspects of the present disclosure include systems and techniques for improving systems and techniques for automatically adjusting exposure of images.

BACKGROUND

A camera is a device that receives light and captures image frames, such as still images or video frames, using an image sensor. Cameras can be configured with a variety of image-capture settings and/or image-processing settings to alter the appearance of images captured thereby. Image-capture settings may be determined and applied before and/or while an image is captured, such as ISO, exposure time (also referred to as exposure, exposure duration, or shutter speed), aperture size (also referred to as f/stop), focus, gain (including analog and/or digital gain), among others. Moreover, image-processing settings can be configured for post-processing of an image, such as alterations to contrast, brightness, saturation, sharpness, levels, curves, and colors, among others.

In photography, the term "exposure" or "exposure duration," relating to an image captured by a camera, refers to the amount of light per unit area that reaches a photographic film, or in modern cameras, an electronic image sensor (e.g., including an array of photodiodes) when capturing the image. The exposure is based on certain image-capture settings such as, for example, exposure time and/or lens aperture, as well as the luminance of the scene being photographed. Because of the relationship between the amount of light that reaches an image sensor and the duration of time the image sensor is allowed to capture the light, the term "exposure" may refer to a duration of time during which the electronic image sensor is exposed to light (e.g., while the electronic image sensor is capturing an image).

Many cameras are equipped with an automatic exposure or "auto exposure" mode that may adjust the image-capture settings (e.g., exposure time, lens aperture, etc.) of the camera based on the luminance of a scene or subject being photographed. In some cases, an automatic exposure control (AEC) engine can perform AEC to determine image-capture settings for an image sensor. For example, when a camera is used to capture images of a dark scene, the AEC engine may adjust the image-capture settings to increase the brightness of images captured by the camera such that details are not lost in underexposed pixels. In some examples, the AEC engine may increase the ISO, the exposure time, the aperture size, and/or the gain to increase the brightness. Similarly, when a camera is used to capture images of a bright scene, the AEC engine may adjust the image-capture settings to decrease the brightness of the images capture by the camera such that details are not lost in overexposed pixels. In some examples, the AEC engine may decrease the ISO, the exposure time, the aperture size, and/or the gain to decrease the brightness.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for adjusting settings for capturing images. According to at least one example, a method is provided for adjusting settings for capturing images. The method includes: receiving a first frame from an image sensor; determining that the first frame is overexposed based on the first frame including a brightness value greater than a threshold; adjusting image-capture settings of the image sensor for a plurality of frames such that each frame of the plurality of frames is captured using a different exposure setting of a plurality of exposure settings; comparing at least one frame of the plurality of frames to the threshold to determine an anchor frame from the plurality of frames, wherein the anchor frame includes a brightness value below the threshold; and adjusting the image-capture settings of the image sensor based on an exposure setting of the anchor frame.

In another example, an apparatus for adjusting settings for capturing images is provided that includes at least one memory and at least one processor (e.g., configured in circuitry) coupled to the at least one memory. The at least one processor configured to: determine that the first frame is overexposed based on the first frame including a brightness value greater than a threshold; adjust image-capture settings of the image sensor for a plurality of frames such that each frame of the plurality of frames is captured using a different exposure setting of a plurality of exposure settings; compare at least one frame of the plurality of frames to the threshold to determine an anchor frame from the plurality of frames, wherein the anchor frame includes a brightness value below the threshold; and adjust the image-capture settings of the image sensor based on an exposure setting of the anchor frame.

In another example, a non-transitory computer-readable medium is provided that has stored thereon instructions that, when executed by one or more processors, cause the one or more processors to: determine that the first frame is overexposed based on the first frame including a brightness value greater than a threshold; adjust image-capture settings of the image sensor for a plurality of frames such that each frame of the plurality of frames is captured using a different exposure setting of a plurality of exposure settings; compare at least one frame of the plurality of frames to the threshold to determine an anchor frame from the plurality of frames, wherein the anchor frame includes a brightness value below the threshold; and adjust the image-capture settings of the image sensor based on an exposure setting of the anchor frame.

In another example, an apparatus for adjusting settings for capturing images is provided. The apparatus includes: means for receiving a first frame from an image sensor; means for determining that the first frame is overexposed based on the first frame including a brightness value greater than a threshold; means for adjusting image-capture settings of the image sensor for a plurality of frames such that each frame of the plurality of frames is captured using a different exposure setting of a plurality of exposure settings; means for comparing at least one frame of the plurality of frames to the threshold to determine an anchor frame from the plurality of frames, wherein the anchor frame includes a brightness value below the threshold; and means for adjusting the image-capture settings of the image sensor based on an exposure setting of the anchor frame.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 6 is a flow diagram illustrating another example process for adjusting image-capture settings, in accordance with aspects of the present disclosure.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As described above, an automatic exposure control (AEC) engine may adjust image-capture settings (e.g., exposure time, lens aperture, etc.) of a camera based on the luminance of a scene or subject being photographed so that images captured by the camera are properly exposed (e.g., not overexposed and not underexposed). An AEC engine may iteratively adjust the image-capture settings based on captured images until the images captured are at a target average brightness. For example, a camera may capture a first image. An AEC engine of the camera may determine that the first image is overexposed and adjust image-capture settings. The camera may capture a second image using the adjusted image-capture settings. The AEC may determine whether the second image is overexposed or not. If the images is overexposed, the AEC engine may adjust the image-capture settings again and the camera may capture a third image using the further adjusted image-capture settings. The AEC engine may iteratively adjust the image-capture settings until captured images are not overexposed. Thus, it may take time for the AEC engine to adjust to the darkness or brightness of a scene.

Figure 1:
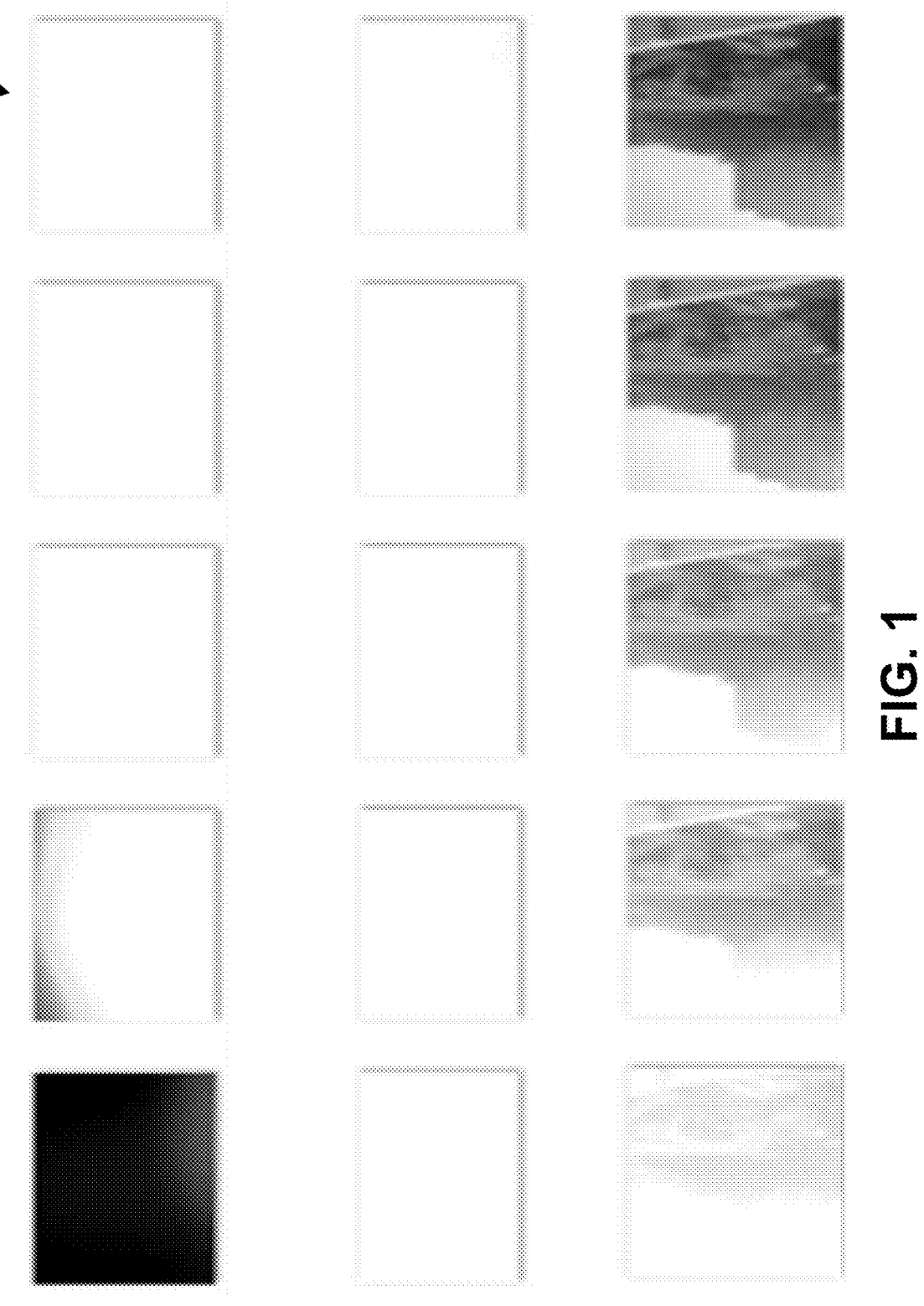
FIG. 1 includes images to illustrate automatic exposure control.

If a camera quickly changes from capturing images of a dark scene to capturing images of a bright scene, the AEC engine may take time to adjust the image-capture settings, resulting in images that are captured during that time being overexposed. For example, if a camera is moved from a relatively dark area to bright area (e.g., from inside a dark room to outside in the daylight) while repeatedly capturing frames (e.g., capturing video data), the camera may capture several frames that are overexposed (e.g., while the AEC engine adjusts the image-capture settings to match the bright scene). For example, FIG. 1 includes 15 images 100 to illustrate AEC. The first image may be captured in a dark area. The next 14 images may be captured in a bright area. The AEC engine may iteratively adjust the image-capture settings used to capture the 14 images to cause the brightness of the images to match the scene.

Systems, apparatuses, methods (also referred to as processes), and computer-readable media (collectively referred to herein as "systems and techniques") are described herein for adjusting image-capture settings of a camera. The systems and techniques described herein may be an improvement over conventional automatic exposure control (AEC) techniques. For instance, the systems and techniques may take less time than conventional AEC techniques to adjust image-capture settings of a camera when a scene of the camera quickly changes from dark to light. In some cases, the systems and techniques may receive image frames (e.g., video data or preview data) from an image sensor. The systems and techniques may compare the image frames to a threshold (e.g., a brightness threshold) to determine if the frames are overexposed. In response to determining that a received frame (e.g., "frame 0") is overexposed (e.g., based on a brightness of the frame being greater than the brightness threshold), the systems and techniques may perform operations to adjust the image-capture settings of the image sensor such that subsequently-captured image frames are not overexposed. The operations may take less time to adjust the image-capture settings than conventional AEC techniques.

For example, the operations may include adjusting image-capture settings of the next N frames to be captured by the image sensor (e.g., the next N frames captured after frame 0). N may be a natural number (e.g., 4, 5, or 6). The systems and techniques may adjust the image-capture settings, and more specifically exposure settings, of each of the next N frames differently. For example, the systems and techniques may set the image-capture settings (and more specifically the exposure settings) of each of the next N frames to different image-capture settings. Exposure settings include adjustments to any of ISO, exposure time, aperture size, focus, analog gain, digital gain, or any combination thereof. The exposure setting (e.g., of the next N frames) may be predetermined (for example, a user or a supervisor system may determine the exposure settings). The exposure settings may be adjusted based on a factor of an exposure of the overexposed image. Additionally, the exposure settings may be adjusted such that the exposure settings of the next N frames may be monotonically decreasing. For example, the systems and techniques may adjust the exposure settings of a first frame by 10× (relative to the overexposed frame), of a second frame by 20×, of a third frame by 40×, of a fourth frame by 60×, of a fifth frame by 80×, of a sixth frame by 160×, of an eighth frame by 320×, of a ninth frame by 640×, etc.

In some cases, there may be a delay (e.g., a pipeline delay) between when an image-capture setting is adjusted and when an image frame captured according to the adjusted settings is available for analysis. The delay may be greater than the time it takes to capture multiple image frames. For example, the delay may take as long as it takes to capture three image frames. In such an example, the first frame may be available for analysis at about the same time that the fourth image-capture setting is adjusted.

The operations may include comparing the N frames (e.g., one at a time, as they become available for analysis, such as, after a pipeline delay) to a threshold (e.g., a brightness threshold) to determine a frame that is not overexposed (e.g., a first frame of the N frames that is not overexposed), such as based on a brightness of the frame being less than the brightness threshold. The brightness threshold can be set to any suitable value (e.g., a value of 50, a value of 70, a value of 100, or other value). The determined frame that is not overexpose may referred to as an "anchor frame." In cases in which the exposure settings of the N frames is monotonically decreasing, the first frame that is not overexposed (e.g., based on a brightness of the frame being less than the brightness threshold) may be the anchor frame. In such cases, after determining the anchor frame, the remaining frames of the N frames do not need to be compared to the threshold because they will be less exposed than the anchor frame and the anchor frame has already been determined. In cases in which the pipeline delay is longer than the time it takes to make images available for analysis, when the anchor frame is determined, the systems and techniques may cease adjusting any remainder of the N frames by the predetermined exposure settings.

The operations may include, after determining the anchor frame, adjusting the image-capture settings (including the exposure settings) of the image sensor based on the exposure settings of the anchor frame such that subsequently-captured image frames are captured according to the adjusted image-capture settings. Additionally or alternatively, the systems and techniques may initiate a conventional AEC algorithm based on the anchor frame and/or the exposure of the anchor frame. The AEC algorithm may fine tune the image-capture settings as the subsequently-capture images become available for analysis.

Additionally, or alternatively, in some cases, the systems and techniques may further fine tune the images-capture settings based on any remaining frames of the N frames after the anchor frame. For example, where there is a pipeline delay, a remainder of the N frames may be received after determining the anchor frame. The remainder of the N frames, and their respective image-capture settings may be used by the AEC to further fine tune the image capture settings.

Additionally, in order to increase the speed of the performing the operations, the systems and techniques may increase a frame-capture rate of the image sensor while performing the operations. For example, in response to determining that frame 0 is overexposed, the systems and techniques may increase the frame-capture rate of the image sensor. After adjusting the image-capture settings based on the exposure of the anchor frame the systems and techniques may decrease the frame-capture rate of the image sensors to a pre-increase frame rate. For example, in response to an instruction from an application, an image sensor may be capturing image frames at a rate of 30 frames per second (FPS). While performing the operations, and/or before determining the anchor frame, the systems and techniques may increase the frame-capture rate of the image sensor to 120 FPS. After the operations are finished, and/or after the image-capture settings of the anchor frame are determined, the systems and techniques may decrease the frame-capture rate to the pre-increase frame rate (e.g., 30 FPS).

The systems and techniques may determine to not process (e.g., by one or more image signal processors (ISPs) of the camera) and/or output at least some of the frames captured while performing the operations. For example, in cases in which the systems and techniques increase the frame-capture rate of the image sensor, the systems and techniques may determine to process and/or output image frames at a rate no higher than the pre-increase frame-capture rate. For example, in response to an instruction from an application, an image sensor may be capturing image frames at a rate of 30 FPS. While performing the operations, the systems and techniques may increase the frame-capture rate of the image sensor to 120 FPS. Yet, the systems and techniques may cause frames to be processed and/or output at 30 FPS (e.g., to match the instructions of the application).

As another example, in response to determining frame 0 is overexposed, the systems and techniques may determine that a certain number (based on a known pipeline delay) of following frames will also be overexposed. The systems and techniques may determine to not process and/or output the certain number of following frames. Additionally or alternatively, before determining the anchor frame (and during a pipeline delay duration after determining the anchor frame), the systems and techniques may determine to not process and/or output frames. For example, the systems and techniques may determine to not process and/or output frames between frame 0 and the anchor frame based on an assumption that the frames between frame 0 and the anchor frame will be overexposed based on the frames being exposed more than the anchor frame. Additionally or alternatively, the systems and techniques may determine to not process and/or output the certain number of frames after the anchor frame based on an assumption that the certain number of frames will be underexposed based the frames being exposed less than the anchor frame.

Various aspects of the application will be described with respect to the figures below.

Figure 2:
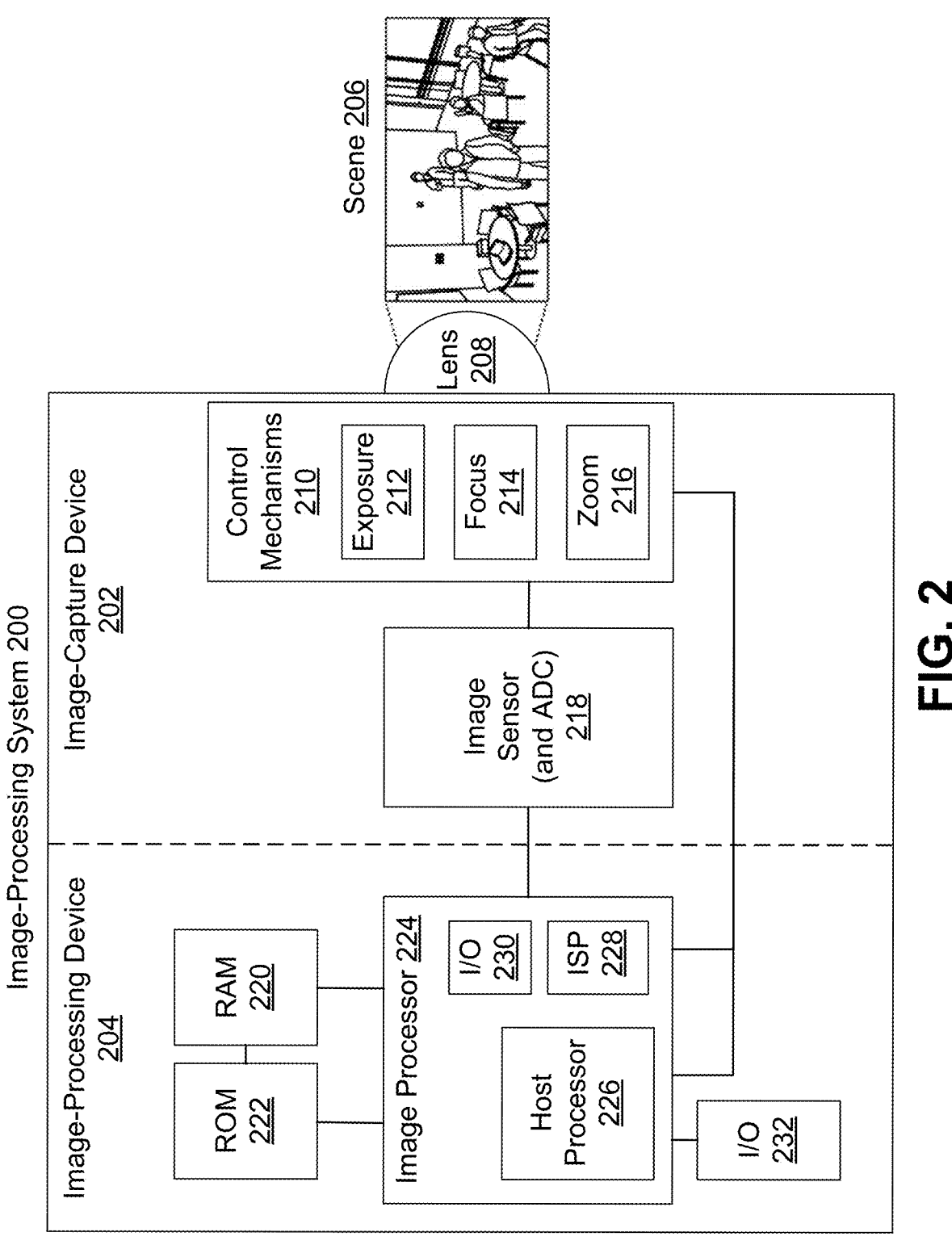
FIG. 2 is a block diagram illustrating an example architecture of an image-processing system, according to various aspects of the present disclosure.

FIG. 2 is a block diagram illustrating an example architecture of an image-processing system 200, according to various aspects of the present disclosure. The image-processing system 200 includes various components that are used to capture and process images, such as an image of a scene 206. The image-processing system 200 can capture image frames (e.g., still images or video frames). In some cases, the lens 208 and image sensor 218 (which may include an analog-to-digital converter (ADC)) can be associated with an optical axis. In one illustrative example, the photosensitive area of the image sensor 218 (e.g., the photodiodes) and the lens 208 can both be centered on the optical axis.

In some examples, the lens 208 of the image-processing system 200 faces a scene 206 and receives light from the scene 206. The lens 208 bends incoming light from the scene toward the image sensor 218. The light received by the lens 208 then passes through an aperture of the image-processing system 200. In some cases, the aperture (e.g., the aperture size) is controlled by one or more control mechanisms 210. In other cases, the aperture can have a fixed size.

The one or more control mechanisms 210 can control exposure, focus, and/or zoom based on information from the image sensor 218 and/or information from the image processor 224. In some cases, the one or more control mechanisms 210 can include multiple mechanisms and components. For example, the control mechanisms 210 can include one or more exposure-control mechanisms 212, one or more focus-control mechanisms 214, and/or one or more zoom-control mechanisms 216. The one or more control mechanisms 210 may also include additional control mechanisms besides those illustrated in FIG. 2. For example, in some cases, the one or more control mechanisms 210 can include control mechanisms for controlling analog gain, flash, HDR, depth of field, and/or other image capture properties.

The focus-control mechanism 214 of the control mechanisms 210 can obtain a focus setting. In some examples, focus-control mechanism 214 stores the focus setting in a memory register. Based on the focus setting, the focus-control mechanism 214 can adjust the position of the lens 208 relative to the position of the image sensor 218. For example, based on the focus setting, the focus-control mechanism 214 can move the lens 208 closer to the image sensor 218 or farther from the image sensor 218 by actuating a motor or servo (or other lens mechanism), thereby adjusting the focus. In some cases, additional lenses may be included in the image-processing system 200. For example, the image-processing system 200 can include one or more microlenses over each photodiode of the image sensor 218.

The microlenses can each bend the light received from the lens 208 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 210, the image sensor 218, and/or the image processor 224. The focus setting may be referred to as an image capture setting and/or an image processing setting. In some cases, the lens 208 can be fixed relative to the image sensor and the focus-control mechanism 214.

The exposure-control mechanism 212 of the control mechanisms 210 can obtain an exposure setting. In some cases, the exposure-control mechanism 212 stores the exposure setting in a memory register. Based on the exposure setting, the exposure-control mechanism 212 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 218 (e.g., ISO speed or film speed), analog gain applied by the image sensor 218, or any combination thereof. The exposure setting may be referred to as an image capture setting and/or an image processing setting.

The zoom-control mechanism 216 of the control mechanisms 210 can obtain a zoom setting. In some examples, the zoom-control mechanism 216 stores the zoom setting in a memory register. Based on the zoom setting, the zoom-control mechanism 216 can control a focal length of an assembly of lens elements (lens assembly) that includes the lens 208 and one or more additional lenses. For example, the zoom-control mechanism 216 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 208 in some cases) that receives the light from the scene 206 first, with the light then passing through a focal zoom system between the focusing lens (e.g., lens 208) and the image sensor 218 before the light reaches the image sensor 218. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 216 moves one or more of the lenses in the focal zoom system, such as the negative lens and one or both of the positive lenses. In some cases, zoom-control mechanism 216 can control the zoom by capturing an image from an image sensor of a plurality of image sensors (e.g., including image sensor 218) with a zoom corresponding to the zoom setting. For example, the image-processing system 200 can include a wide-angle image sensor with a relatively low zoom and a telephoto image sensor with a greater zoom. In some cases, based on the selected zoom setting, the zoom-control mechanism 216 can capture images from a corresponding sensor.

The image sensor 218 includes one or more arrays of photodiodes or other photosensitive elements. Each photodiode measures an amount of light that eventually corresponds to a particular pixel in the image produced by the image sensor 218. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 218 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 218 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 210 may be included instead or additionally in the image sensor 218. The image sensor 218 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 7:
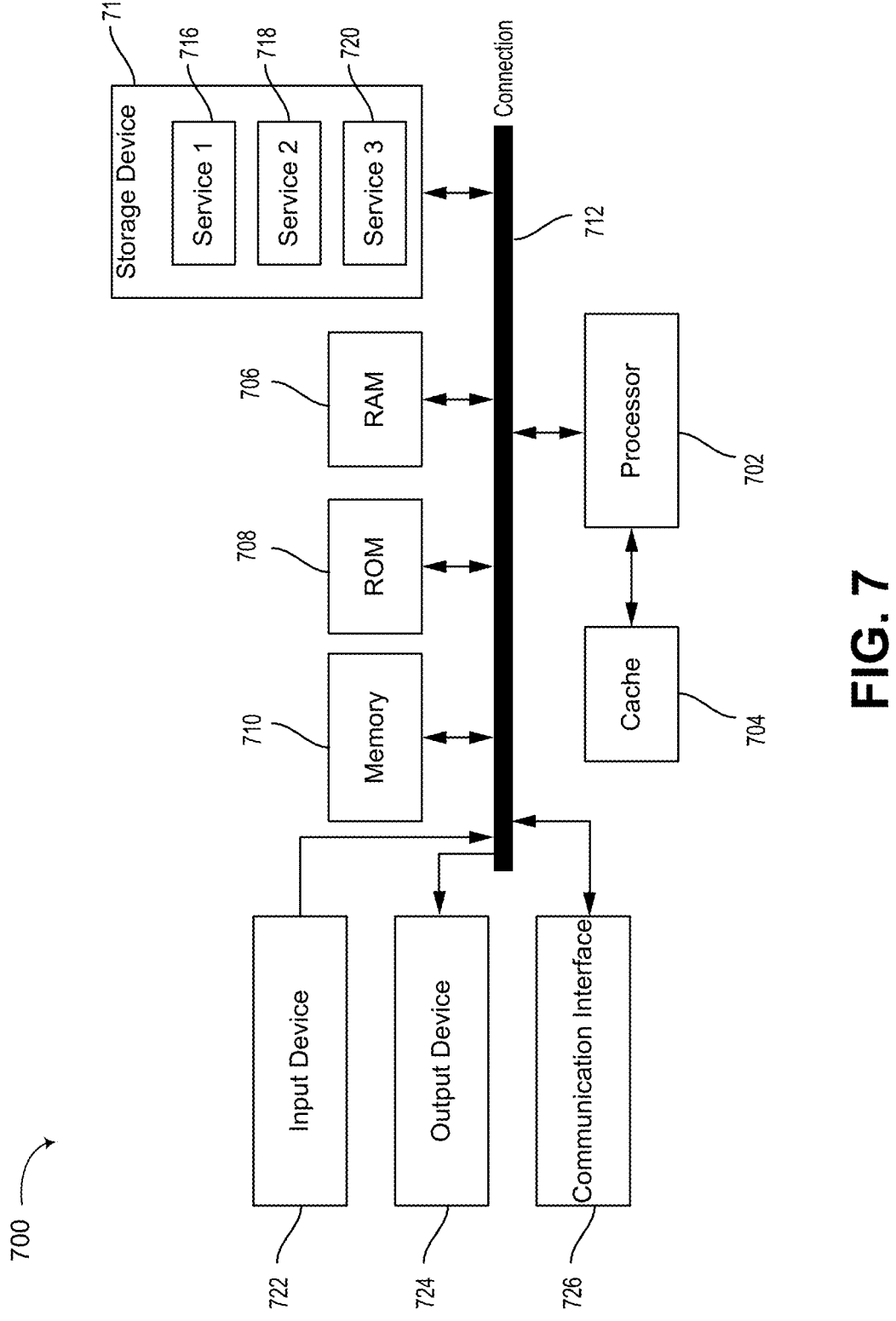
FIG. 7 is a block diagram illustrating an example computing-device architecture of an example computing device which can implement the various techniques described herein.

The image processor 224 may include one or more processors, such as one or more image signal processors (ISPs) (including ISP 228), one or more host processors (including host processor 226), and/or one or more of any other type of processor discussed with respect to the computing-device architecture 700 of FIG. 7. The host processor 226 can be a digital signal processor (DSP) and/or other type of processor. In some implementations, the image processor 224 is a single integrated circuit or chip (e.g., referred to as a system-on-chip or SoC) that includes the host processor 226 and the ISP 228. In some cases, the chip can also include one or more input/output ports (e.g., input/output (I/O) ports 230), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 230 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 226 can communicate with the image sensor 218 using an I2C port, and the ISP 228 can communicate with the image sensor 218 using an MIPI port.

The image processor 224 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 224 may store image frames and/or processed images in random-access memory (RAM) 220, read-only memory (ROM) 222, a cache, a memory unit, another storage device, or some combination thereof.

Various input/output (I/O) devices 232 may be connected to the image processor 224. The I/O devices 232 can include a display screen, a keyboard, a keypad, a touchscreen, a trackpad, a touch-sensitive surface, a printer, any other output devices, any other input devices, or any combination thereof. In some cases, a caption may be input into the image-processing device 204 through a physical keyboard or keypad of the I/O devices 232, or through a virtual keyboard or keypad of a touchscreen of the I/O devices 232. The I/O devices 232 may include one or more ports, jacks, or other connectors that enable a wired connection between the image-processing system 200 and one or more peripheral devices, over which the image-processing system 200 may receive data from the one or more peripheral device and/or transmit data to the one or more peripheral devices. The I/O devices 232 may include one or more wireless transceivers that enable a wireless connection between the image-processing system 200 and one or more peripheral devices, over which the image-processing system 200 may receive data from the one or more peripheral device and/or transmit data to the one or more peripheral devices. The peripheral devices may include any of the previously-discussed types of the I/O devices 232 and may themselves be considered I/O devices 232 once they are coupled to the ports, jacks, wireless transceivers, or other wired and/or wireless connectors.

In some cases, the image-processing system 200 may be a single device. In some cases, the image-processing system 200 may be two or more separate devices, including an image-capture device 202 (e.g., a camera) and an image-processing device 204 (e.g., a computing device coupled to the camera). In some implementations, the image-capture device 202 and the image-capture device 202 may be coupled together, for example via one or more wires, cables, or other electrical connectors, and/or wirelessly via one or more wireless transceivers. In some implementations, the image-capture device 202 and the image-processing device 204 may be disconnected from one another.

As shown in FIG. 2, a vertical dashed line divides the image-processing system 200 of FIG. 2 into two portions that represent the image-capture device 202 and the image-processing device 204, respectively. The image-capture device 202 includes the lens 208, control mechanisms 210, and the image sensor 218. The image-processing device 204 includes the image processor 224 (including the ISP 228 and the host processor 226), the RAM 220, the ROM 222, and the I/O device 232. In some cases, certain components illustrated in the image-capture device 202, such as the ISP 228 and/or the host processor 226, may be included in the image-capture device 202. In some examples, the image-processing system 200 can include one or more wireless transceivers for wireless communications, such as cellular network communications, 802.11 wi-fi communications, wireless local area network (WLAN) communications, or some combination thereof.

The image-processing system 200 can be part of, or implemented by, a single computing device or multiple computing devices. In some examples, the image-processing system 200 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s).

While the image-processing system 200 is shown to include certain components, one of ordinary skill will appreciate that the image-processing system 200 can include more components than those shown in FIG. 2. The components of the image-processing system 200 can include software, hardware, or one or more combinations of software and hardware. For example, in some implementations, the components of the image-processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 200.

In some examples, the computing-device architecture 700 shown in FIG. 7 and further described below can include the image-processing system 200, the image-capture device 202, the image-processing device 204, or a combination thereof.

In some examples, the image-processing system 200 can create an HDR image using multiple image frames with different exposures. For example, the image-processing system 200 can create an HDR image using a short exposure (SE) image, a medium exposure (ME) image, and a long exposure (LE) image. As another example, the image-processing system 200 can create an HDR image using an SE image and an LE image. In some cases, the image-processing system 200 can write the different image frames from one or more camera frontend engines to a memory device, such as a DDR memory device or any other memory device. A post-processing engine can then retrieve the image frames and fuse (e.g., merge, combine) them into a single image. As previously explained, the different write and read operations used to create the HDR image can result in significant power and bandwidth consumption.

Figure 3:
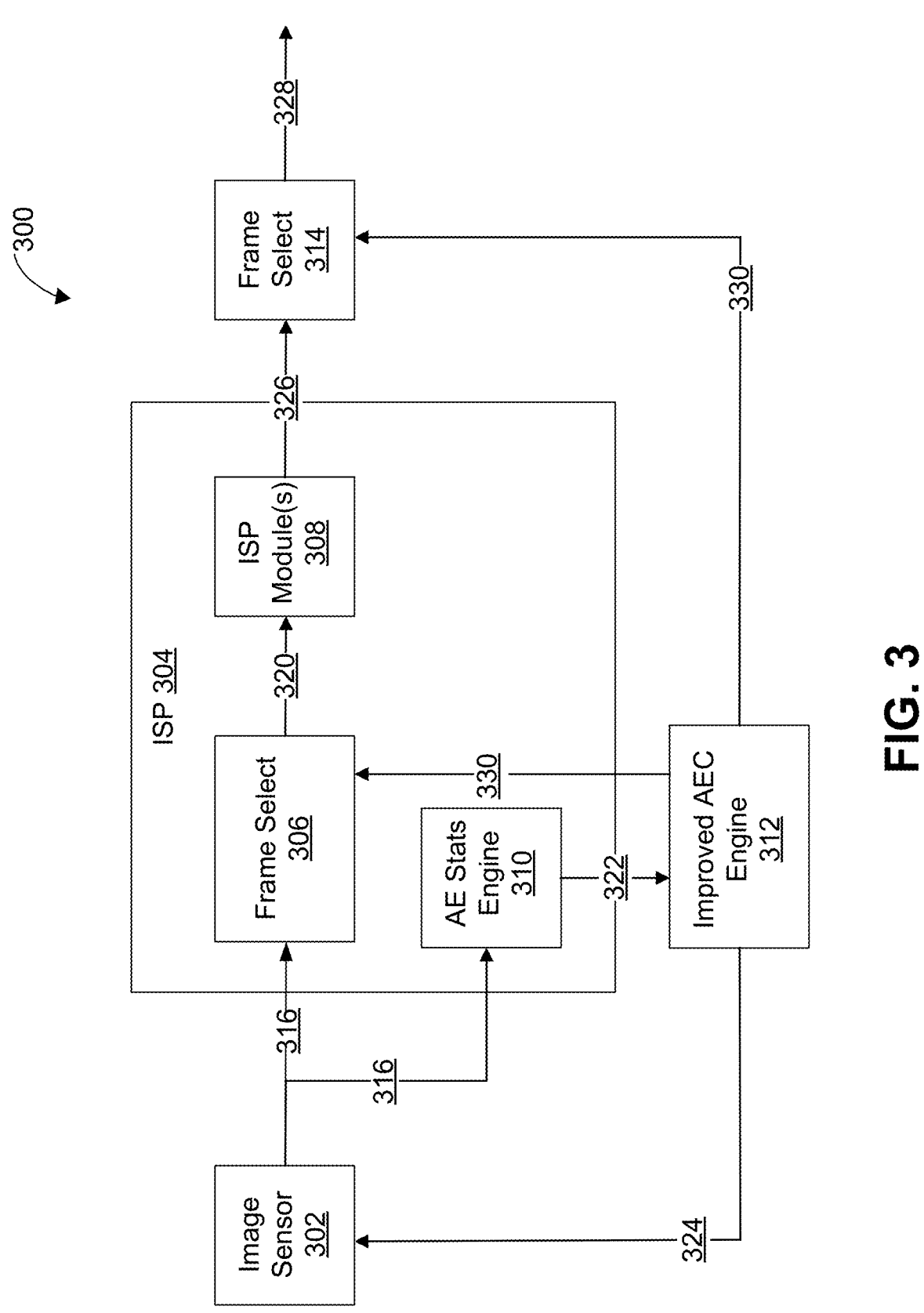
FIG. 3 is a block diagram illustrating an example system for adjusting image-capture settings 324, according to various aspects of the present disclosure.

FIG. 3 is a block diagram illustrating an example system 300 for adjusting image-capture settings 324 (including exposure settings), according to various aspects of the present disclosure. For example, system 300 includes an image sensor 302 that may capture image frames 316. System 300 also includes an improved automatic exposure control (AEC) engine 312 that may provide image-capture settings 324 (including improved exposure settings) to image sensor 302. Image sensor 302 may adjust how image sensor 302 is capturing image frames 316 based on image-capture settings 324. Improved AEC engine 312 may adjust image-capture settings 324 to improve how image sensor 302 is able to capture images when image sensor 302 is moved from a dark scene into a bright scene. For example, Improved AEC engine 312 may, by adjusting image-capture settings 324, decrease a duration of time during which image frames 316 are overexposed as compared with conventional AEC techniques.

Image sensor 302 may be the same as, may be substantially similar to, and/or may perform the same, or substantially the same, operations as image-processing device 204 of FIG. 2. Image sensor 302 may capture image frames 316. Image frames 316 may be sequential frames of video data. Additionally, or alternatively, image frames 316 may be sequential frames of an image preview (e.g., image frames 316 may be captured and displayed to a user without being stored). Image sensor 302 may be capable of capturing image frames 316 at a number of frame-capture rates. For example, image sensor 302 may be configured to capture image frames 316 at 30 frames per second (FPS), 60 FPS, 90 FPS, or 120 FPS.

ISP 304 may be the same as, may be substantially similar to, and/or may perform the same, or substantially the same, operations as image-processing device 204 or image processor 224 of FIG. 2. ISP 304 may include a number of ISP module(s) 308 that may perform image processing on image frames 316. For example, ISP module(s) 308 may perform operations related to sensor-related processing (e.g., defect-pixel correction, and demosaicing), lens processing (e.g., shading correction), color correction, tone and gamma processing, noise reduction, sharpening color space conversion, pixel interpolation, automatic exposure control (AEC), automatic gain control (AGC), contrast detect autofocus (CDAF), automatic white balance, merging of image frames to form an HDR image.

Improved AEC engine 312 may iteratively adjust image-capture settings 324 of image sensor 302 to match image-capture settings 324 to a brightness of a scene being captured by image sensor 302. For example, improved AEC engine 312 may have a target frame brightness and improved AEC engine 312 may adjust image-capture settings 324 to cause image frames 316 to have the target frame brightness.

ISP 304 may include an Automatic Exposure (AE) statistics engine ("AE stats engine 310") that may receive image frames 316 from image sensor 302 and generate AE data 322. AE data 322 may be representative of a brightness of image frames 316. For example, AE stats engine 310 may downsample each of image frames 316 (e.g., by selecting one pixel out of every four pixels or one pixel out of every nine pixels) to generate AE data 322. Additionally, or alternatively, AE stats engine 310 may average groups of pixels of image frames 316 to generate AE data 322.

In a default mode of operation, improved AEC engine 312 may make small adjustments to image-capture settings 324 based on changes of brightness of image frames 316. Such small adjustments may keep image frames 316 close to the target brightness in most situations. However, if the brightness of image frames 316 becomes bright quickly, improved AEC engine 312 may initiate operations described herein to quickly determine image-capture settings 324 to bring image frames 316 back to the target brightness.

In order to speed up the operations, improved AEC engine 312 may determine to increase a frame-capture rate of image sensor 302. For example, initially, image sensor 302 may capture images at a rate of 30 FPS. As an example, the operations, once initiated, may take 8 frames to determine appropriate image-capture settings 324 to bring image frames 316 back to the target brightness. 8 frames, at 30 FPS may take $\frac{8}{30}$ of a second (0.267 seconds), but perhaps more importantly for a user, the operations taking 8 frames results in 8 overexposed frames. To speed up the operations, improved AEC engine 312 may increase the frame-capture rate of image sensor 302 to 120 FPS for the duration of performing the operations. At 120 FPS, 8 frames may take $\frac{8}{120}$ of a second (0.067 seconds). Further, because the user may expect frames at 30 FPS, improved AEC engine 312 may cause system 300 to provide frames no faster than 30

FPS. For example, ISP 304 may receive image frames 316 at 120 FPS and improved AEC engine 312 may cause system 300 to output image frames 328 at 30 FPS (e.g., by discarding, not processing, or not outputting three of every four frames). In this way, system 300 may output only 2 overexposed images while performing the operations.

For example, improved AEC engine 312 may provide frame-select control signal 330 to frame select 306 and/or to frame select 314. Frame select 306 may downselect image frames 316 (e.g., based on a ratio between the initial frame-capture rate and the increased frame-capture rate) to generate image frames 320. ISP module(s) 308 may process image frames 320 to generate processed image frames 326. Frame select 314 may downselect processed image frames 326 to generate image frames 328. In some aspects, system 300 may include one or the other of frame select 306 and frame select 314. If system 300 includes frame select 306, system 300 may conserve power by conserving operations at ISP module(s) 308 (e.g., by downselecting image frames 316 to generate image frames 320 before processing image frames 320).

Figure 4:
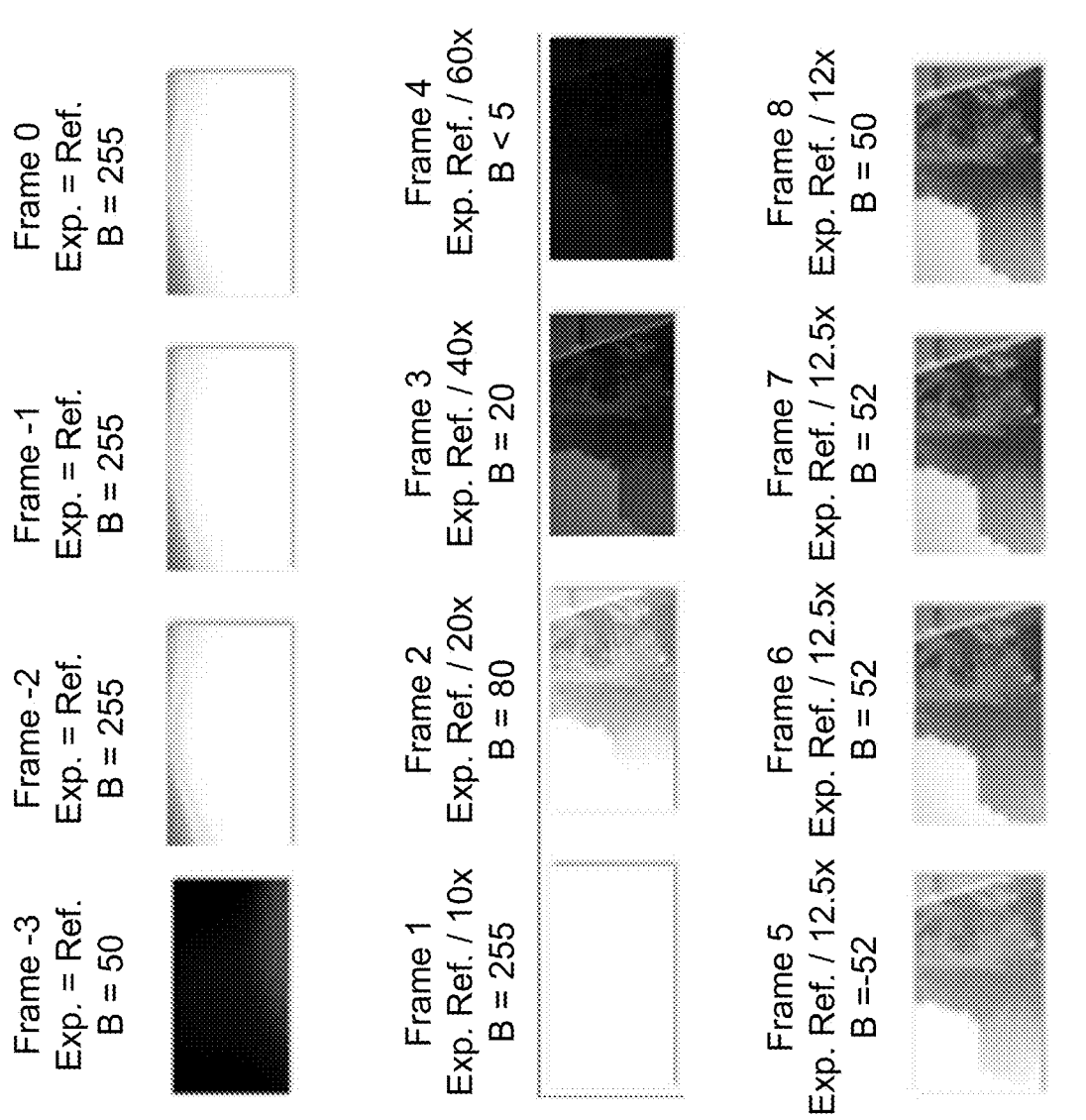
FIG. 4 includes example frames that may be analyzed by an improved AEC engine while improved AEC engine adjusts image-capture settings, according to various aspects of the present disclosure.

Additional detail regarding the operations of improved AEC engine 312 are provided with regard to FIG. 4. For example, FIG. 4 includes frames (e.g., of image frames 316) that may be analyzed by improved AEC engine 312 while improved AEC engine 312 adjusts image-capture settings 324, according to various aspects of the present disclosure. Further, Table 1 includes a description of the frames and operations that may be performed responsive to the frames.

TABLE 1

| Capture Frame Number | Exposure Sequence | Process Frame Number | Frame Brightness | AEC Functionality | Anchor Frame | Sensor Mode |
|---|---|---|---|---|---|---|
| 0 | Ref. | −3 | 50 | Analyze and Run | Yes | Default |
| 1 | Ref./10x | −2 | 255 | Skip | No | FSM |
| 2 | Ref./20x | −1 | 255 | Skip | No | FSM |
| 3 | Ref./40x | 0 | 255 | Skip | No | FSM |
| 4 | Ref./60x | 1 | 255 | Analyze | No | FSM |
| 5 | Ref./12.5x | 2 | 80 | Analyze and Run | Yes | FSM |
| 6 | Ref./12.5x | 3 | 20 | Skip or Fine Tune | No | FSM |
| 7 | Ref./12.5x | 4 | <5 | Skip or Fine Tune | No | FSM |
| 8 | Ref./12.6x | 5 | 52 | Analyze and Run | Yes | Default |
| 9 | Ref./12.6x | 6 | 52 | Analyze and Run | Yes | Default |

A frame-by-frame example is provided of operations that may be performed by systems and techniques (e.g., improved AEC engine 312 of FIG. 3). The frame-by-frame example references frames as described by Table 1 and illustrated in FIG. 4. However, prior to the frame-by-frame example, a description of the meaning of some of the columns of Table 1 and the terms in Table 1 is provided.

There may be a delay between when an image-capture setting is determined and set and when an image captured according to the image-capture setting is available for analysis by the systems and techniques. For example, there may be a pipeline delay between when improved AEC engine 312 determines image-capture settings 324 and when the first of image frames 316 captured according to the image-capture settings 324 is available to be analyzed by improved AEC engine 312. The example illustrated by Table 1 and FIG. 4 exhibits a pipeline delay corresponding to the time it takes to captures three images. For example, at about the time that image-capture settings for frame 4 may be set, frame 1 may be available for analysis. Thus, any changes made in response to analysis of frame 1 will affect the capture of frame 4. The pipeline delay, and the relationship between when image-capture settings of frames may be adjusted and when the frames are available for analysis is represented in Table 1 as rows and by the columns "Capture Frame Number" and "Process Frame Number."

In Table 1, the values in the column "Exposure Sequence" corresponds to the frame numbers in the adjacent column "Capture Frame Number." For example, frame 0 may be captured with a reference ("Ref.") Exposure Sequence and frame 1 may be captured with a reference divided by 10 ("Ref./10x") Exposure Sequence. A row three rows down illustrates the analysis of frame 0 (e.g., to illustrate that frame 0 will be available for analysis three capture durations later). The values of the columns "Frame Brightness" correspond to the frame numbers in the adjacent column "Process Frame Number." For example, in the fourth row of Table 1, it can be seen that frame 0 had a brightness of 255 and in the fifth row of Table 1, it can be seen that frame 1 had a brightness of 255.

The column "Exposure Sequence" is an example of image-capture settings (including exposure settings) used to capture the corresponding frame of "Capture Frame Number." The "Exposure Sequence" may represent the totality of the effect of adjusting image-capture settings. For example, the Exposure Sequence may include adjustments to ISO, exposure time, aperture size, focus, and/or gain (including analog and/or digital gain). The term "Ref." in the "Exposure Sequence" and in FIG. 4 refers to a reference image-capture setting. The systems and techniques may adjust the image capture settings by factors ("x") relative to the reference image-capture setting. For example, frame 0 may be captured with the reference image-capture setting and frame 1 may be captured with the reference divided by 10 (e.g., the exposure duration of frame 1 may be 10 times shorter than the exposure duration of frame 0).

The column "Frame Brightness" may be an example of a measure of brightness of the corresponding "Process Frame Number." The Frame Brightness may be a measure of an average brightness of the whole frame. The Frame Brightness values are given in a range of 0 to 255 as an example (e.g., based on representing pixels using 8-bit values). Thus, a frame with a Frame Brightness of 0 may be almost completely black and a frame with a Frame Brightness of 255 may be almost completely white. According to such a range, a target Frame Brightness may be 50. For example, frame 4 may have a brightness of less than 5 and may be mostly black and frame 0 may have a brightness of 255 and may be almost completely white. A frame with a brightness of 255 may be overexposed. For example, the brightness of the scene may be such that the image-capture settings render the image as mostly values at the top of the range of available values.

The columns "AEC Functionality," "Anchor Frame," and "Sensor Mode" may describe operations of the systems and techniques (e.g., operations of improved AEC engine 312). For example, a description in the column "AEC Functionality" may describe how the corresponding "Process Frame Number" is analyzed using AEC techniques. Further, the AEC analysis may inform the image-capture settings. For example, frame 2 may be analyzed and an AEC algorithm may be run relative to frame 2. Further, the image-capture setting may be adjusted for frame 5 based on the analysis performed on frame 2. Thus, in this example, the Exposure Sequence of frame 5 may be set to Ref/12.5× based on the analysis of frame 2.

The column "Anchor Frame" may indicate whether the corresponding "Process Frame Number" is determined to be an anchor frame. A frame that is within a threshold from the target brightness may be determined to be an anchor frame. For example, frame 2, having a brightness of 80, may be within a threshold from 50 (e.g., the threshold may be from 30 to 100). Frame 2 may be identified as an anchor frame. Based on frame 2 being identified as an anchor frame, image-capture settings 324 may be adjusted based on frame 2 for subsequent frames (e.g., frame 5). As an example, based on frame 2 being identified as an anchor frame, the image-capture settings of frame 5 may be set based on the image-capture settings of frame 2.

The column "Sensor Mode" may refer to whether the image sensor is set to an increased frame-capture rate or not. For example, as described with regard to FIG. 3, in some cases, improved AEC engine 312 may increase a frame-capture rate of image sensor 302 (e.g., such that improved AEC engine 312 may complete its operations in fewer output frames). Column "Sensor Mode" may indicate whether, in response to the corresponding Process Frame Number, improved AEC engine 312 increases a frame-capture rate of image sensor 302. For example, "Default" may indicate that improved AEC engine 312 does not adjust the frame-capture rate of image sensor 302. Additionally, "FSM" may indicate that improved AEC engine 312 adjusts the frame-capture rate of image sensor 302 to be in a "fast shutter mode" (FSM).

Turning now to the frame-by-frame example of Table 1 and FIG. 4, frame −3 is the first frame of the example. Frame −3 is described on row 1 of Table 1. Frame −3 has a brightness of 50 (indicated by the Frame Brightness column). Accordingly, frame −3 is selected as an anchor frame (as indicated by the "yes" in the Anchor frame column). Further, frame −3 is analyzed and adjusted by the AEC algorithm (as indicated in the AEC Functionality column). Frame −3 is not overexposed and thus improved AEC engine 312 leaves the frame-capture rate of image sensor 302 in a default state. Based on frame −3 having a brightness of 50, the image-capture settings for the capture of frame 0 may be left the same as the image-capture settings used to capture frame −3, for example, the image-capture settings may be left at "Ref." (as indicated by the Exposure Sequence column). Frame −3 may have been preceded by any number of frames that also had a brightness within the threshold from the target brightness. Frame −3 may be captured in a relatively dark setting (e.g., indoors or in the dark).

Frame −2 (on the second row of Table 1) has a brightness of 255. Frame −2 may be overexposed, such as based on the brightness of frame −2 exceeding a brightness threshold. For example, Frame −2 may be captured in a relatively bright setting (e.g., outdoors or after turning on lights in a dark room). The brightness of the scene captured by frame −2 may be much brighter than the brightness of the scene captured by frame −3. In some cases, Frame −3 and Frame −2 are captured with a reference exposure setting, in which case the reference exposure setting resulted in frame −3 with the target brightness and frame −2 being too bright (e.g., having a brightness of 255).

Improved AEC engine 312 may determine to initiate the operations of correcting the exposure of upcoming frames based on frame −2 having a brightness that exceeds the threshold. For example, frame −2 may be determined to not be an anchor frame (e.g., as indicated in the Anchor Frame column). Further, in response to frame −2 having a brightness exceeding the threshold, several adjustments may be made for the capture of frame 1 and subsequent frames. As a first example, the default AEC algorithm may be skipped with regard to frame −2. For example, rather than making a small adjustment of the image-capture settings for the capture of frame 1 and waiting to see if frame 1 (when available for analysis) is not overexposed, improved AEC engine 312 may make adjustments to the image-capture settings of the next N frames. N may be a natural number (e.g., 3, 4, 5, or 6). In some cases, improved AEC engine 312 may make adjustments to all frames until an anchor frame is determined. Improved AEC engine 312 may determine to adjust each of the next N frames according to predetermined image-capture settings. For example, based on frame −2, improved AEC engine 312 may determine to adjust the image-capture settings of frame 1 by a factor of 10, the image-capture settings of frame 2 by a factor of 20, image-capture settings 324 of frame 3 by a factor of 40, and the image-capture settings of frame 4 by a factor of 60, frame 5 by a factor of 80, frame 6 by a factor of 160, frame 7 by a factor of 320, frame 8 by a factor of 640, etc. In some cases, improved AEC engine 312 may determine to adjust image-capture settings 324 such that the brightness of the next N frames is monotonically decreasing (assuming the brightness of the scene remains the same). Further still, based on frame −2 having a brightness beyond the threshold, improved AEC engine 312 may determine to increase the frame-capture rate of image sensor 302 (as indicated by "FSM" in the Sensor Mode column). Improved AEC engine 312 may determine to maintain the increased frame-capture rate until a pipeline delay after an anchor frame is determined. For example, improved AEC engine 312 may determine to maintain the increased frame-capture rate until adjustments to image-capture settings 324 have taken effect. In other words, until image frames captured according to the adjusted image-capture settings 324 are available for processing. Improved AEC engine 312 may forego processing and/or outputting frame −2 based on frame −2 having a brightness outside the threshold and/or based on frame −2 being selected as the anchor frame.

Frame −1 (on the third row of Table 1) has a brightness of 255. Frame −1 may be overexposed. Improved AEC engine 312 may have already initiated the operations to determine image-capture settings 324 based on the brightness of frame −2 exceeding the threshold. Improved AEC engine 312 may know that there is a three-frame pipeline delay between when image-capture settings 324 were adjusted and when the first image captured according to the adjusted image-capture settings 324 is available for analysis. For example, improved AEC engine 312 may know that the results of adjusting image-capture settings 324 based on frame −2 won't be available for improved AEC engine 312 to analyze until frame 1 is available to analyze. Thus, improved AEC engine 312 may continue the operations without adjustment based on frame −1. Additionally, or alternatively, improved AEC engine 312 may determine to continue the operations based on frame −1 also having a brightness exceeding the threshold. For example, improved AEC engine 312 may determine that frame −1, captured before image-capture settings 324 take effect, is not an anchor frame. Further, improved AEC engine 312 may maintain the increased frame-capture rate of image sensor 302. Further still, based on having determined to set image-capture settings 324 of the next N frames, improved AEC engine 312 may set image-capture settings 324 of frame 2 to Ref./20×. Improved AEC engine 312 may forego processing and/or outputting frame −1 based on frame −1 having a brightness outside the threshold and/or based on frame −1 being selected as the anchor frame.

Frame 0 (on the fourth row of Table 1) has a brightness of 255. Improved AEC engine 312 may have already initiated the operations to determine image-capture settings 324 based on the brightness of frame −2 exceeding the threshold. Improved AEC engine 312 may continue the operations without adjustment based on frame 0. For example, based on having determined to set image-capture settings 324 of the next N frames, improved AEC engine 312 may set image-capture settings 324 of frame 3 to Ref./40×. Improved AEC engine 312 may forego processing and/or outputting frame 0 based on frame 0 having a brightness outside the threshold and/or based on frame 0 being selected as the anchor frame.

Frame 1 (on the fifth row of Table 1) is the frame image captured according to image-capture settings 324 adjusted based on the operations. For example, frame 1 was captured according to image-capture settings 324 that were set responsive to frame −2 exceeding the threshold (frame 1 was captured with image-capture settings 324 of Ref./10×). Accordingly, frame 1 may be analyzed to see the effects of the adjustments made responsive to frame −2 were effective in causing the brightness of frame 1 within a threshold brightness (e.g., 20 to 200) (as indicated by "Analyze" in the AEC Functionality column). Frame 1 has a brightness of 255 (e.g., outside the threshold). Accordingly, frame 1 is not selected as an anchor frame and image-capture settings 324 for frame 4 are not set based on frame 1. Based on having determined to set image-capture settings 324 of the next N frames, improved AEC engine 312 may set image-capture settings 324 of frame 4 to Ref./60×. Improved AEC engine 312 may forego processing and/or outputting frame 1 based on frame 1 having a brightness outside the threshold and/or based on frame 1 being selected as the anchor frame.

Frame 2 (on the sixth row of Table 1) is the second frame captured according to image-capture settings 324 adjusted based on the operations. Frame 2 was captured with image-capture settings 324 of Ref./20×. Frame 2 may be analyzed to see the effects of the adjustments made responsive to frame −1 were effective in causing the brightness of frame 2 to be within a threshold brightness (e.g., 20 to 200). Frame 2 has a brightness of 80 (e.g., within the threshold of 20 to 100). Accordingly, frame 2 may be selected as an anchor frame (e.g., as indicated in the Anchor Frame column) and image-capture settings 324 for frame 5 (and subsequent frames e.g., frame 6 and frame 7) are set based on frame 2 (e.g., as indicated by "Analyze and Run" in the AEC Functionality column). For example, based on frame 2 being captured with image-capture settings 324 of Ref./20× and having a brightness of 80, image-capture settings 324 for frame 5, frame 6, and frame 7 may be set to cause frame 5, frame 6, and frame 7 to have a brightness as close as possible to the target brightness (e.g., 50). Specifically, image-capture settings 324 of frame 5, frame 6, and frame 7 may be set according to a linear equation. For example, image-capture settings 324 for frame 5, frame 6, and frame 7 may be set according to Ref./(20×*50/80) (e.g., Ref./12.5×). Based on the pipeline delay, frame 5 will not be available for analysis for another 3 frames. Thus, improved AEC engine 312 may maintain image sensor 302 in the increased frame-capture rate (e.g., as indicated by "FSM" in the Sensor Mode column). Improved AEC engine 312 may process and/or output frame 2 based on frame 2 having a brightness within the threshold and/or based on frame 5 being selected as the anchor frame.

Frame 3 (on the seventh row of Table 1) is the third frame captured according to image-capture settings 324 adjusted based on the operations. Frame 3 was captured with image-capture settings 324 of Ref./40×. Improved AEC engine 312 may or may not analyze frame 3 to determine whether frame 3 is an anchor frame. For example, improved AEC engine 312 previously determined that frame 2 is the anchor frame, thus improved AEC engine 312 may forego analyzing frame 3 (e.g., as indicated by the "skip" in the AEC Functionality column). Additionally, or alternatively, the brightness of frame 3 may be analyzed to fine tune image-capture settings 324 of upcoming frames (e.g., to further improve the brightness of the upcoming frames according to a conventional AEC fine tuning technique) (e.g., as indicated by the "Fine Tune" in the AEC Functionality column). For example, frame 3 has a brightness of 20 and an Exposure Sequence of Ref./40×. Improved AEC engine 312 may use that information to further fine tune image-capture settings 324 of frame 6 (e.g., based on image-capture settings 324 determined for frame 5).

Frame 4 (on the eighth row of Table 1) is the fourth frame captured according to image-capture settings 324 adjusted based on the operations. Frame 4 was captured with image-capture settings 324 of Ref./60×. Improved AEC engine 312 may or may not analyze frame 4 to determine whether frame 4 is an anchor frame. For example, improved AEC engine 312 previously determined that frame 2 is the anchor frame, thus improved AEC engine 312 may forego analyzing frame 4 (e.g., as indicated by the "skip" in the AEC Functionality column). Additionally, or alternatively, the brightness of frame 4 may be analyzed to fine tune image-capture settings 324 of upcoming frames (e.g., to further improve the brightness of the upcoming frames according to a conventional AEC fine tuning technique) (e.g., as indicated by the "Fine Tune" in the AEC Functionality column). For example, frame 4 has a brightness of <5 and an Exposure Sequence of Ref./60×. Improved AEC engine 312 may use that information to further fine tune image-capture settings 324 of frame 7 (e.g., based on image-capture settings 324 determined for frame 5).

Frame 5 (on the ninth row of Table 1) is the first frame captured according to image-capture settings 324 adjusted based on frame 2 (which was determined to be the anchor frame. Frame 5 was captured with image-capture settings 324 of Ref./12.5×. Based on frame 5 having a brightness of 52 (e.g., within the target threshold), improved AEC engine 312 may determine that frame 5 is an anchor frame. Further, improved AEC engine 312 may adjust image capture settings of frame 8 (and subsequent frames) based on the brightness of frame 5. For example, improved AEC engine 312 may set an Exposure Sequence of frame 8 to be Ref./12.6× based on frame 5 (having an Exposure Sequence of Ref./12.5× and a brightness of 52). Improved AEC engine 212 may analyze frame 5 according to conventional AEC techniques (e.g., to perform fine tuning adjustments to frame 8 and subsequent frames) (as indicated by the "analyze and run" in the AEC Functionality column). Based on frame 5 being a pipeline delay after frame 2 (which was the first anchor frame) and/or based on frame 5 being within or below the brightness threshold, improved AEC engine 312 may determine to cause image sensor 302 to return to its pre-increase frame-capture rate (as indicated by the "default" in the Sensor Mode column).

There are 7 frames between frame −2, which is overexposed, and frame 5, which is 5 which is within the target threshold. Further, image-capture settings 324 for frame 5 were set based on frame 2, which was within the target threshold. This is significant because image processor 224 for frame 5 were determined and implemented despite a pipeline delay. As such, frame 6 and subsequent frames may also be properly exposed based on image processor 224. In the iterative AEC approach illustrate by FIG. 1, there are 12 frames between the first overexposed frame and a frame that is about as bright as frame 5. Thus, improved AEC engine 312 adjusts image-capture settings to match a scene in fewer frames that conventional AEC techniques. Further, by increasing the frame-capture rate between frame –2 and frame 8, improved AEC engine 312 decreases a time that it takes for improved AEC engine 312 to adjust the image-capture settings. The decreased time may translate into processing and/or outputting fewer overexposed frames.

Figure 5:
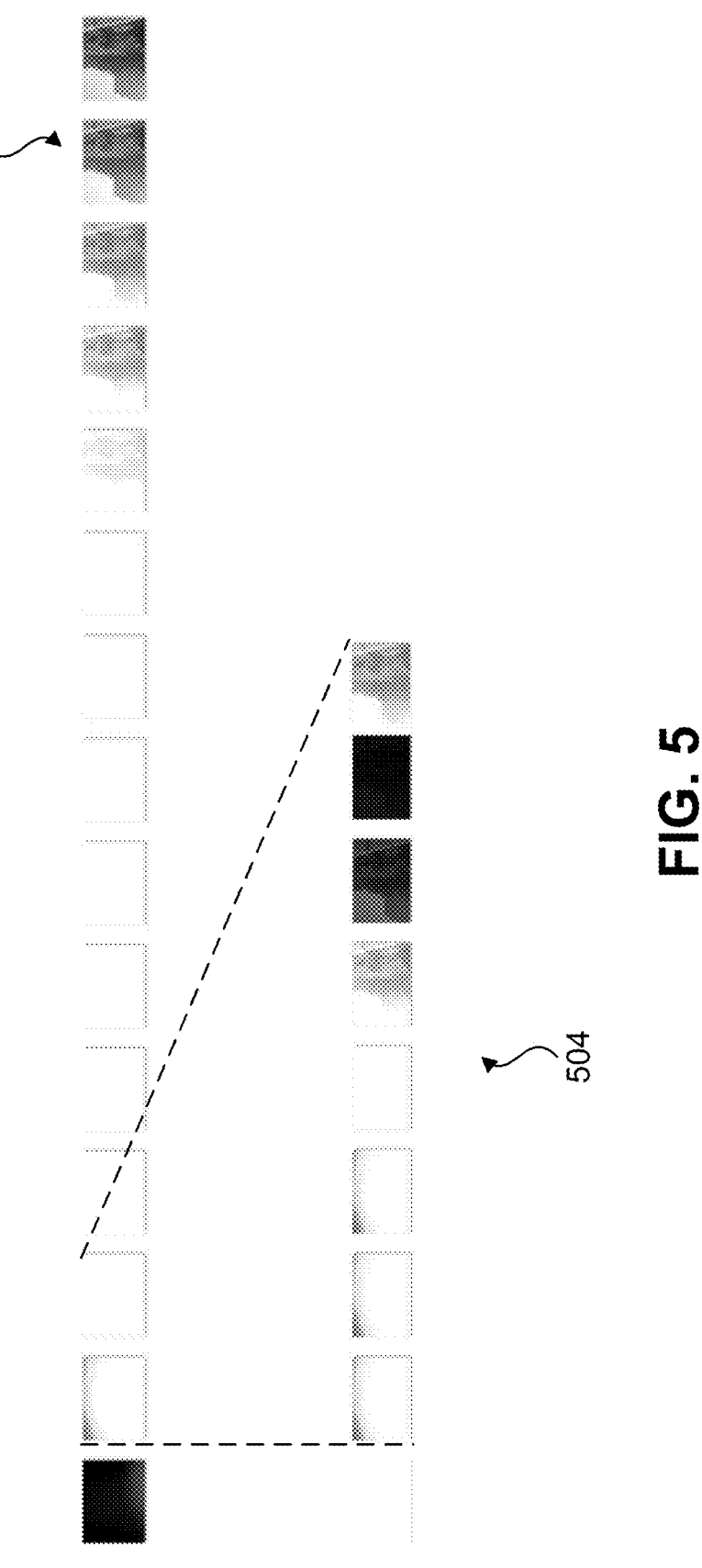
FIG. 5 includes two sets of example images, image-capture settings of one of which may be adjusted according to various aspects of the present disclosure.

For example, FIG. 5 includes two sets of example images. In particular, FIG. 5 includes images 502 which may be captured with image-capture settings that are iteratively adjusted by conventional AEC techniques. FIG. 5 also includes images 504 which may be captured with image-capture settings that are selected and adjusted by systems and techniques, according to various aspects of the present disclosure. Images 504 includes fewer frames between a first overexposed frame and a properly exposed image than images 502 includes between a first overexposed and a properly exposed frame.

Further, by increasing a frame-capture rate after between when the first overexposed frame is processed and when the properly exposed image is processed, the systems and techniques may cause all of the operations to adjust the image-capture settings to occur within the time it takes to capture fewer frames. For example, it may take as long for the systems and techniques to determine and adjust the image-capture settings to capture properly exposed images as it takes for conventional AEC techniques to capture two frames.

FIG. 6 is a flow diagram illustrating a process 600 for adjusting image-capture settings, in accordance with aspects of the present disclosure. One or more operations of process 600 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 600. The one or more operations of process 600 may be implemented as software components that are executed and run on one or more processors.

At a block 602, a computing device (or one or more components thereof) may receive a first frame from an image sensor. For example, system 300 of FIG. 3, may receive a first image frame of image frames 316. For example, system 300 may receive frame –2 of FIG. 4 and of table 1.

At a block 604, the computing device (or one or more components thereof) may determine that the first frame is overexposed based on the first frame including a brightness value greater than a threshold. For example, system 300 (or more specifically, improved AEC engine 312 of system 300) may determine that frame –2 is overexposed (e.g., based on frame –2 having a Frame Brightness of 255 as described with relation to table 1.

At a block 606, the computing device (or one or more components thereof) may adjust image-capture settings of the image sensor for a plurality of frames such that each frame of the plurality of frames is captured using a different exposure setting of a plurality of exposure settings. In some aspects, the plurality of frames may be a natural number (e.g., N) of frames. For example, system 300 (or more specifically, improved AEC engine 312 of system 300) may adjust exposure settings of image sensor 302 for a number of frames (e.g., N frames) such that each of the number of frames is captured using a different exposure setting. For instance, improved AEC engine 312 may adjust an Exposure Sequence of Capture Frame 1 to be a reference exposure setting (e.g., the exposure setting which frame –2 was captured) scaled by a factor of 10 (e.g., Ref/10×). Further, improved AEC engine 312 may adjust the Exposure Sequence of Capture Frame 2 to be Ref./20×, the Exposure Sequence of Capture Frame 3 to be Ref./40×, and the Exposure Sequence of Capture Frame 4 to be Ref./60×.

In some aspects, each exposure setting of the plurality of exposure settings may be less than an exposure setting with which the first frame was exposed. For example improved AEC engine 312 may adjust the Exposure Sequence of Capture Frame 1 to be Ref./10×, the Exposure Sequence of Capture Frame 2 to be Ref./20×, the Exposure Sequence of Capture Frame 3 to be Ref./40×, and the Exposure Sequence of Capture Frame 4 to be Ref./60×. In some aspects, the plurality of exposure settings used to capture the plurality of frames may be monotonically decreasing. For example improved AEC engine 312 may adjust the Exposure Sequence of Capture Frame 1 to be Ref./10×, the Exposure Sequence of Capture Frame 2 to be Ref./20×, the Exposure Sequence of Capture Frame 3 to be Ref./40×, and the Exposure Sequence of Capture Frame 4 to be Ref./60×.

At a block 608, the computing device (or one or more components thereof) may compare at least one frame of the plurality of frames to the threshold to determine an anchor frame from the plurality of frames, wherein the anchor frame includes a brightness value below the threshold. For example, system 300 (or more specifically, improved AEC engine 312) may compare the number of frames with exposure settings adjusted at block 606 to a threshold to determine an anchor frame. For example, at block 608, improved AEC engine 312 may compare frame 1 and frame 2 to a brightness threshold. Frame 2, with a brightness of 80, may satisfy the brightness threshold and thus may be determined to be the anchor frame.

In some aspects, to compare the at least one frame of the plurality of frames to the threshold (e.g., at block 608), the computing device (or one or more components thereof) may compare each of the plurality of frames to the threshold until the anchor frame is determined. For example, improved AEC engine 312 may compare frame 1 when it is received, then compare frame 2 when it is received. In some aspects, the computing device (or one or more components thereof) may, after the anchor frame is determined, skip comparing remaining ones of the plurality of frames to the threshold. For example, because frame 2 is determined to be the anchor frame (based on the example described herein), improved AEC engine 312 may not compare others of the number of frames adjusted at block 604. For example, based on determining that frame 2 is the anchor frame, improved AEC engine 312 may not compare frame 3 and frame 4 to the brightness threshold despite frame 3 and frame 4 having been captured with adjusted image-capture settings (at block 604).

In some aspects, the computing device (or one or more components thereof) may output and/or process the anchor frame. For example, improved AEC engine 312 may process and/or output frame 2 (e.g., table 1 indicates that the AEC functionality for frame 2 is "analyze and run").

In some aspects, the computing device (or one or more components thereof) may initiate an automatic exposure control (AEC) algorithm on the anchor frame. For example, improved AEC engine 312 may perform AEC on frame 2. For example table 1 indicates that the AEC functionality for frame 2 is "analyze and run."

In some aspects, the computing device (or one or more components thereof) may skip processing and/or skip outputting of others of the plurality of frames. For example, improved AEC engine 312 may skip processing and/or outputting of frame 1, frame 3, and frame 4. For example, table 1 indicates that the AEC functionality for frame 1 is "analyze," the AEC functionality for frame 3 includes "skip", and the AEC functionality for frame 4 includes "skip."

In some aspects, the computing device (or one or more components thereof) may use the AEC algorithm on others of the plurality of frames that are captured after the anchor frame. For example, improved AEC engine 312 may perform AEC operations using frame 3 and frame 4. For example, table 1 indicates that the AEC functionality for frame 3 includes "fine tune", and the AEC functionality for frame 4 includes "fine tune."

At a block 610, the computing device (or one or more components thereof) may adjust the image-capture settings of the image sensor based on an exposure setting of the anchor frame. For example, system 300 (or more specifically improved AEC engine 312) may adjust image-capture settings of image sensor 302 based on the image-capture settings of the anchor frame (e.g., frame 2).

In some aspects, the computing device (or one or more components thereof) may, in response to determining that the first frame is overexposed, increase a frame-capture rate of the image sensor and after adjusting the image-capture settings of the image sensor based on the exposure setting of the anchor frame, decrease the frame-capture rate of the image sensor to a pre-increase frame-capture rate. For example, improved AEC engine 312 may increase a frame-capture rate of image sensor 302 between capturing frame 1 and frame 7. For instance, table 1 includes "FSM" indicating a fast-shutter mode for the capture of frames 1 through frame 7.

In some aspects, the computing device (or one or more components thereof) may, while the frame-capture rate of the image sensor is increased, determine to not process at least some frames captured at the increased frame-capture rate. In some aspects, the computing device (or one or more components thereof) may, while the frame-capture rate of the image sensor is increased, determine to not output at least some frames captured at the increased frame-capture rate. For example, improved AEC engine 312 may determine to not process and/or output frames −1, 0, 1, 3, and 4 (e.g., as indicated by the AEC Functionality of frames −1, 0, 1, 3, and 4 including "skip") based on frames −1, 0, 1, 3, and 4 being captured at the increased frame rate.

In some aspects, the computing device (or one or more components thereof) may determine to not process a number of frames after the first frame based on a pipeline delay. In some aspects, the computing device (or one or more components thereof) may determine to not output a number of frames after the first frame based on a pipeline delay. For example, improved AEC engine 312 may determine to not process and/or output frames −1 and 0 based no frame −2 being overexposed and based on system 300 exhibiting a pipeline delay of 3.

In some aspects, the computing device (or one or more components thereof) may determine to not process frames of the plurality of frames that precede the anchor frame. In some aspects, the computing device (or one or more components thereof) may determine to not output frames of the plurality of frames that precede the anchor frame. For example, improved AEC engine 312 may determine to not process and/or output frames 1 (e.g., as indicated by the AEC Functionality of frames 1 including "skip") based on frame 1 being a frame adjusted by block 604 and yet preceding the anchor frame.

In some aspects, the computing device (or one or more components thereof) may determine to not process a number of frames after the anchor frame based on a pipeline delay. In some aspects, the computing device (or one or more components thereof) may determine to not output a number of frames after the anchor frame based on a pipeline delay. For example, improved AEC engine 312 may determine to not process and/or output frames 3 and 4 (e.g., as indicated by the AEC Functionality of frames 3 and 4 including "skip") based on frames 3 and 4 being captured after the anchor frame 2 and yet before the frames captured according to the adjusted image-capture settings are available at ISP 304.

In some examples, as noted previously, the methods described herein (e.g., process 600 of FIG. 6 and/or other methods described herein) can be performed, in whole or in part, by a computing device or apparatus. In one example, one or more of the methods can be performed by image-processing system 200 of FIG. 2, image-processing device 204 of FIG. 2, image processor 224 of FIG. 2, system 300 of FIG. 3, ISP 304 of FIG. 3, improved AEC engine 312 of FIG. 3, or by another system or device. In another example, one or more of the methods (e.g., process 600 of FIG. 6, and/or other methods described herein) can be performed, in whole or in part, by the computing-device architecture 700 shown in FIG. 7. For instance, a computing device with the computing-device architecture 700 shown in FIG. 7 can include, or be included in, the components of image-processing system 200 of FIG. 2, image-processing device 204 of FIG. 2, image processor 224 of FIG. 2, system 300 of FIG. 3, ISP 304 of FIG. 3, improved AEC engine 312 of FIG. 3 and can implement the operations of process 600 and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 600 and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600 and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

FIG. 7 illustrates an example computing-device architecture 700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 700 may include, implement, or be included in any or all of image-processing system 200 of FIG. 2, image-processing device 204 of FIG. 2, image processor 224 of FIG. 2, system 300 of FIG. 3, ISP 304 of FIG. 3, improved AEC engine 312 of FIG. 3.

The components of computing-device architecture 700 are shown in electrical communication with each other using connection 712, such as a bus. The example computing-device architecture 700 includes a processing unit (CPU or processor) 702 and computing device connection 712 that couples various computing device components including computing device memory 710, such as read only memory (ROM) 708 and random-access memory (RAM) 706, to processor 702.

Computing-device architecture 700 can include a cache of high-speed memory connected directly with, in close proximity to, or integrated as part of processor 702. Computing-device architecture 700 can copy data from memory 710 and/or the storage device 714 to cache 704 for quick access by processor 702. In this way, the cache can provide a performance boost that avoids processor 702 delays while waiting for data. These and other modules can control or be configured to control processor 702 to perform various actions. Other computing device memory 710 may be available for use as well. Memory 710 can include multiple different types of memory with different performance characteristics. Processor 702 can include any general-purpose processor and a hardware or software service, such as service 1 716, service 2 718, and service 3 720 stored in storage device 714, configured to control processor 702 as well as a special-purpose processor where software instructions are incorporated into the processor design. Processor 702 may be a self-contained system, containing multiple cores or processors, a bus, memory controller, cache, etc. A multi-core processor may be symmetric or asymmetric.

To enable user interaction with the computing-device architecture 700, input device 722 can represent any number of input mechanisms, such as a microphone for speech, a touch-sensitive screen for gesture or graphical input, keyboard, mouse, motion input, speech and so forth. Output device 724 can also be one or more of a number of output mechanisms known to those of skill in the art, such as a display, projector, television, speaker device, etc. In some instances, multimodal computing devices can enable a user to provide multiple types of input to communicate with computing-device architecture 700. Communication interface 726 can generally govern and manage the user input and computing device output. There is no restriction on operating on any particular hardware arrangement and therefore the basic features here may easily be substituted for improved hardware or firmware arrangements as they are developed.

Storage device 714 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 706, read only memory (ROM) 708, and hybrids thereof. Storage device 714 can include services 716, 718, and 720 for controlling processor 702. Other hardware or software modules are contemplated. Storage device 714 can be connected to the computing device connection 712. In one aspect, a hardware module that performs a particular function can include the software component stored in a computer-readable medium in connection with the necessary hardware components, such as processor 702, connection 712, output device 724, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core), or any other such configuration. Accordingly, the term "processor," as used herein may refer to any of the foregoing structure, any combination of the foregoing structure, or any other structure or apparatus suitable for implementation of the techniques described herein.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. An apparatus for adjusting settings for capturing images, the apparatus comprising: at least one memory; and at least one processor coupled to the at least one memory and configured to: receive a first frame from an image sensor; determine that the first frame is overexposed based on the first frame including a brightness value greater than a threshold; adjust image-capture settings of the image sensor for a plurality of frames such that each frame of the plurality of frames is captured using a different exposure setting of a plurality of exposure settings; compare at least one frame of the plurality of frames to the threshold to determine an anchor frame from the plurality of frames, wherein the anchor frame includes a brightness value below the threshold; and adjust the image-capture settings of the image sensor based on an exposure setting of the anchor frame.

Aspect 2. The apparatus of aspect 1, wherein, to compare the at least one frame of the plurality of frames to the threshold, the at least one processor is configured to compare each of the plurality of frames to the threshold until the anchor frame is determined.

Aspect 3. The apparatus of aspect 2, wherein the at least one processor is further configured to, after the anchor frame is determined, skip comparing remaining ones of the plurality of frames to the threshold.

Aspect 4. The apparatus of any one of aspects 1 to 3, wherein the plurality of exposure settings used to capture the plurality of frames are monotonically decreasing.

Aspect 5. The apparatus of any one of aspects 1 to 3, wherein each exposure setting of the plurality of exposure settings is less than an exposure setting with which the first frame was exposed.

Aspect 6. The apparatus of any one of aspects 1 to 5, wherein the at least one processor is further configured to at least one of process or output the anchor frame.

Aspect 7. The apparatus of aspect 6, wherein the at least one processor is further configured to at least one of skip processing or skip outputting of others of the plurality of frames.

Aspect 8. The apparatus of any one of aspects 1 to 7, wherein the at least one processor is further configured to initiate an automatic exposure control (AEC) algorithm on the anchor frame.

Aspect 9. The apparatus of aspect 8, wherein the at least one processor is configured to use the AEC algorithm on others of the plurality of frames that are captured after the anchor frame.

Aspect 10. The apparatus of any one of aspects 1 to 9, wherein the at least one processor is further configured to, in response to determining that the first frame is overexposed, increase a frame-capture rate of the image sensor and after adjusting the image-capture settings of the image sensor based on the exposure setting of the anchor frame, decrease the frame-capture rate of the image sensor to a pre-increase frame-capture rate.

Aspect 11. The apparatus of aspect 10, wherein the at least one processor is further configured to, while the frame-capture rate of the image sensor is increased, determine to not process at least some frames captured at the increased frame-capture rate.

Aspect 12. The apparatus of any one of aspects 10 or 11, wherein the at least one processor is further configured to, while the frame-capture rate of the image sensor is increased, determine to not output at least some frames captured at the increased frame-capture rate.

Aspect 13. The apparatus of any one of aspects 1 to 12, wherein the at least one processor is further configured to determine to not process a number of frames after the first frame based on a pipeline delay.

Aspect 14. The apparatus of any one of aspects 1 to 13, wherein the at least one processor is further configured to determine to not output a number of frames after the first frame based on a pipeline delay.

Aspect 15. The apparatus of any one of aspects 1 to 14, wherein the at least one processor is further configured to determine to not process frames of the plurality of frames that precede the anchor frame.

Aspect 16. The apparatus of any one of aspects 1 to 15, wherein the at least one processor is further configured to determine to not output frames of the plurality of frames that precede the anchor frame.

Aspect 17. The apparatus of any one of aspects 1 to 16, wherein the at least one processor is further configured to determine to not process a number of frames after the anchor frame based on a pipeline delay.

Aspect 18. The apparatus of any one of aspects 1 to 17, wherein the at least one processor is further configured to determine to not output a number of frames after the anchor frame based on a pipeline delay.

Aspect 19. The apparatus of any one of aspects 1 to 18, wherein the plurality of frames includes N frames, wherein N is a natural number.

Aspect 20. A method for adjusting settings for capturing images, the method comprising: receiving a first frame from an image sensor; determining that the first frame is overexposed based on the first frame including a brightness value greater than a threshold; adjusting image-capture settings of the image sensor for a plurality of frames such that each frame of the plurality of frames is captured using a different exposure setting of a plurality of exposure settings; comparing at least one frame of the plurality of frames to the threshold to determine an anchor frame from the plurality of frames, wherein the anchor frame includes a brightness value below the threshold; and adjusting the image-capture settings of the image sensor based on an exposure setting of the anchor frame.

Aspect 21. The method of aspect 20, wherein comparing the at least one frame of the plurality of frames to the threshold comprises comparing each of the plurality of frames to the threshold until the anchor frame is determined.

Aspect 22. The method of aspect 21, further comprising, after the anchor frame is determined, skipping comparing remaining ones of the plurality of frames to the threshold.

Aspect 23. The method of any one of aspects 20 to 22, wherein the plurality of exposure settings used to capture the plurality of frames are monotonically decreasing.

Aspect 24. The method of aspects 20 to 23, wherein each exposure setting of the plurality of exposure settings is less than an exposure setting with which the first frame was exposed.

Aspect 25. The method of aspects 20 to 24, further comprising at least one of processing or outputting the anchor frame.

Aspect 26. The method of aspect 25, further comprising at least one of skipping processing or skipping outputting of others of the plurality of frames.

Aspect 27. The method of aspects 20 to 26, further comprising initiating an automatic exposure control (AEC) algorithm on the anchor frame.

Aspect 28. The method of aspect 27, further comprising using the AEC algorithm on others of the plurality of frames that are captured after the anchor frame.

Aspect 29. The method of aspects 20 to 28, further comprising, in response to determining that the first frame is overexposed, increasing a frame-capture rate of the image sensor and after adjusting the image-capture settings of the image sensor based on the exposure setting of the anchor frame, decreasing the frame-capture rate of the image sensor to a pre-increase frame-capture rate.

Aspect 30. The method of aspect 29, further comprising, while the frame-capture rate of the image sensor is increased, determining to not process at least some frames captured at the increased frame-capture rate.

Aspect 31. The method of aspects 29 or 30, further comprising, while the frame-capture rate of the image sensor is increased, determining to not output at least some frames captured at the increased frame-capture rate.

Aspect 32. The method of aspects 20 to 31, further comprising determining to not process a number of frames after the first frame based on a pipeline delay.

Aspect 33. The method of aspects 20 to 32, further comprising determining to not output a number of frames after the first frame based on a pipeline delay.

Aspect 34. The method of aspects 20 to 33, further comprising determining to not process frames of the plurality of frames that precede the anchor frame.

Aspect 35. The method of aspects 20 to 34, further comprising determining to not output frames of the plurality of frames that precede the anchor frame.

Aspect 36. The method of aspects 20 to 35, further comprising determining to not process a number of frames after the anchor frame based on a pipeline delay.

Aspect 37. The method of aspects 20 to 36, further comprising determining to not output a number of frames after the anchor frame based on a pipeline delay.

Aspect 38. The method of aspects 20 to 37, wherein the plurality of frames includes N frames, wherein N is a natural number.

Aspect 39. A non-transitory computer-readable storage medium having stored thereon instructions that, when executed by at least one processor, cause the at least one processor to perform operations according to any of aspects 20 to 38.

Aspect 40. An apparatus for providing virtual content for display, the apparatus comprising one or more means for perform operations according to any of aspects 20 to 38.

What is claimed is:

1. An apparatus for adjusting settings for capturing images, the apparatus comprising:

at least one memory; and at least one processor coupled to the at least one memory and configured to:

receive a first frame from an image sensor;

determine that the first frame is overexposed based on the first frame including a brightness value greater than a threshold;

in response to determining that the first frame is overexposed, determine two or more exposure settings to apply;

in response to determining that the first frame is overexposed, adjust image-capture settings of the image sensor for two or more frames captured during a pipeline delay such that each frame of the two or more frames is captured using a different exposure setting of the two or more exposure settings, wherein the pipeline delay comprises a duration between when an image-capture setting is set and when an image captured using the image-capture setting is available for analysis;

compare at least one frame of the two or more frames to the threshold to determine an anchor frame from among the two or more frames, wherein the anchor frame includes a brightness value below the threshold; and adjust the image-capture settings of the image sensor based on an exposure setting of the anchor frame.

2. The apparatus of claim 1, wherein, to compare the at least one frame of the two or more frames to the threshold, the at least one processor is configured to compare each frame of the two or more frames to the threshold until the anchor frame is determined.

3. The apparatus of claim 2, wherein the at least one processor is further configured to, after the anchor frame is determined, skip comparing remaining ones of the two or more frames to the threshold.

4. The apparatus of claim 1, wherein the two or more exposure settings used to capture the two or more frames are monotonically decreasing.

5. The apparatus of claim 1, wherein each exposure setting of the two or more exposure settings is less than an exposure setting with which the first frame was exposed.

6. The apparatus of claim 1, wherein the at least one processor is further configured to at least one of process or output the anchor frame.

7. The apparatus of claim 6, wherein the at least one processor is further configured to at least one of skip processing or skip outputting of others of the two or more frames.

8. The apparatus of claim 1, wherein the at least one processor is further configured to initiate an automatic exposure control (AEC) algorithm on the anchor frame.

9. The apparatus of claim 8, wherein the at least one processor is configured to use the AEC algorithm on others of the two or more frames that are captured after the anchor frame.

10. The apparatus of claim 1, wherein the at least one processor is further configured to, in response to determining that the first frame is overexposed, increase a frame-capture rate of the image sensor and after adjusting the image-capture settings of the image sensor based on the exposure setting of the anchor frame, decrease the frame-capture rate of the image sensor to a pre-increase frame-capture rate.

11. The apparatus of claim 10, wherein the at least one processor is further configured to, while the frame-capture rate of the image sensor is increased, determine to not process at least some frames captured at the increased frame-capture rate.

12. The apparatus of claim 10, wherein the at least one processor is further configured to, while the frame-capture rate of the image sensor is increased, determine to not output at least some frames captured at the increased frame-capture rate.

13. The apparatus of claim 1, wherein the at least one processor is further configured to determine to not process a number of frames after the first frame based on a pipeline delay.

14. The apparatus of claim 1, wherein the at least one processor is further configured to determine to not output a number of frames after the first frame based on a pipeline delay.

15. The apparatus of claim 1, wherein the at least one processor is further configured to determine to not process frames of the two or more frames that precede the anchor frame.

16. The apparatus of claim 1, wherein the at least one processor is further configured to determine to not output frames of the two or more frames that precede the anchor frame.

17. The apparatus of claim 1, wherein the at least one processor is further configured to determine to not process a number of frames after the anchor frame based on a pipeline delay.

18. The apparatus of claim 1, wherein the at least one processor is further configured to determine to not output a number of frames after the anchor frame based on a pipeline delay.

19. The apparatus of claim 1, wherein the two or more frames includes N frames, wherein N is a natural number.

20. A method for adjusting settings for capturing images, the method comprising:

receiving a first frame from an image sensor;

determining that the first frame is overexposed based on the first frame including a brightness value greater than a threshold;

in response to determining that the first frame is overexposed, determining two or more exposure settings to apply;

in response to determining that the first frame is overexposed, adjusting image-capture settings of the image sensor for two or more frames captured during a pipeline delay such that each frame of the two or more frames is captured using a different exposure setting of two or more exposure settings, wherein the pipeline delay comprises a duration between when an image-capture setting is set and when an image captured using the image-capture setting is available for analysis;

comparing at least one frame of the two or more frames to the threshold to determine an anchor frame from among the two or more frames, wherein the anchor frame includes a brightness value below the threshold; and adjusting the image-capture settings of the image sensor based on an exposure setting of the anchor frame.

21. The method of claim 20, wherein comparing the at least one frame of the two or more frames to the threshold comprises comparing each frame of the two or more frames to the threshold until the anchor frame is determined.

22. The method of claim 21, further comprising, after the anchor frame is determined, skipping comparing remaining ones of the two or more frames to the threshold.

23. The method of claim 20, wherein the two or more exposure settings used to capture the two or more frames are monotonically decreasing.

24. The method of claim 20, wherein each exposure setting of the two or more exposure settings is less than an exposure setting with which the first frame was exposed.

25. The method of claim 20, further comprising at least one of processing or outputting the anchor frame.

26. The method of claim 25, further comprising at least one of skipping processing or skipping outputting of others of the two or more frames.

27. The method of claim 20, further comprising initiating an automatic exposure control (AEC) algorithm on the anchor frame.

28. The method of claim 27, further comprising using the AEC algorithm on others of the two or more frames that are captured after the anchor frame.

29. The method of claim 20, further comprising, in response to determining that the first frame is overexposed, increasing a frame-capture rate of the image sensor and after adjusting the image-capture settings of the image sensor based on the exposure setting of the anchor frame, decreasing the frame-capture rate of the image sensor to a pre-increase frame-capture rate.

30. The method of claim 29, further comprising, while the frame-capture rate of the image sensor is increased, determining to not process at least some frames captured at the increased frame-capture rate.

* * * * *